United States Patent
Szeliski et al.

(10) Patent No.: US 7,590,265 B2
(45) Date of Patent: Sep. 15, 2009

(54) SYSTEM AND METHOD FOR EXTRACTING REFLECTION AND TRANSPARENCY LAYERS FROM MULTIPLE IMAGES

(75) Inventors: Richard S. Szeliski, Bellevue, WA (US); Shmuel Avidan, Bellevue, WA (US); Padmanabhan Anandan, Samammish, WA (US)

(73) Assignee: Microsoft Corp., Redmond, WA (US)

( * ) Notice: Subject to any disclaimer, the term of this patent is extended or adjusted under 35 U.S.C. 154(b) by 809 days.

(21) Appl. No.: 11/242,204

(22) Filed: Oct. 1, 2005

(65) Prior Publication Data
US 2006/0056682 A1 Mar. 16, 2006

Related U.S. Application Data

(62) Division of application No. 09/658,006, filed on Sep. 9, 2000, now Pat. No. 6,987,865.

(51) Int. Cl.
*G06K 9/00* (2006.01)
(52) U.S. Cl. .................. 382/107; 382/103; 382/173; 382/190
(58) Field of Classification Search .................. 382/103, 382/107, 173, 190
See application file for complete search history.

(56) References Cited

U.S. PATENT DOCUMENTS 5,339,113 A * 8/1994 Iwasaki ...................... 348/604

* cited by examiner

*Primary Examiner*—Wesley Tucker
(74) *Attorney, Agent, or Firm*—Lyon & Harr, LLP; Katrina A. Lyon

(57) ABSTRACT

The present invention is embodied in a system and method for extracting structure from multiple images of a scene by representing the scene as a group of image layers, including reflection and transparency layers. In general, the present invention performs layer extraction from multiple images containing reflections and transparencies. The present invention includes an optimal approach for recovering layer images and their associated motions from an arbitrary number of composite images. The present invention includes image formation equations, the constrained least squares technique used to recover the component images, a novel method to estimate upper and lower bounds on the solution using min- and max-composites, and a motion refinement method.

4 Claims, 9 Drawing Sheets

SYSTEM AND METHOD FOR EXTRACTING REFLECTION AND TRANSPARENCY LAYERS FROM MULTIPLE IMAGES

CROSS-REFERENCE TO RELATED APPLICATIONS

This application is a division of a prior application entitled "SYSTEM AND METHOD FOR EXTRACTING REFLECTION AND TRANSPARENCY LAYERS FROM MULTIPLE IMAGES" which was assigned Ser. No. 9/658,006 and filed Sep. 9, 2000.

BACKGROUND OF THE INVENTION

1. Field of the Invention

The present invention relates in general to stereo reconstruction, and in particular, to a system and method for extracting structure from multiple images of a scene by representing the scene as a group of image layers, including reflection and transparency layers.

2. Related Art

Many natural images contain mixtures of reflected (reflections) and transmitted light (transparencies). Many natural images will typically contain one or both, i.e., contain mixtures of reflected and transmitted light. For example, shiny or glass-like surfaces typically create a reflected image of other surfaces in its immediate environment. Also, surfaces like glass and water are (at least partially) transparent, and hence will transmit the light from the surfaces behind it. Although it should be noted that the transmitted light is usually attenuated to some degree by the glass (or frontal surface), and thus, the notion of partial transparency or "translucency" is more general. However, following common usage in the field, the term "transparency" is used to indicate both complete transparency and translucency.

As such, many natural images are composed of reflected and transmitted images, which are super-imposed on each other. When viewed from a moving camera, these component layer images appear to move relative to each other. Techniques to recover the multiple motions are commonly referred to as multiple motion recovery techniques. The problem of multiple motion recovery and the reflection and transmission of light on surfaces in visual images has been addressed in several physics-based vision studies. Likewise, a number of techniques for recovering multiple motions from image sequences have been developed.

These techniques can recover multiple motions even in the presence of reflections and transparency. A subclass of these techniques also extract the individual component layer image from the input composite sequence, but only in the absence of reflections and transparency (i.e., all the layers are opaque). Although several studies locked onto each component motion, they actually created a "reconstructed" image of each layer through temporal integration and fell short of being a proper extraction of the component layers. This is because the other layers were not fully removed, but rather appeared as blurred streaks.

The detection of transparency in single images has been studied, but these studies do not provide a complete technique for layer extraction from general images. Thus, current and previous systems have not demonstrated how to accurately recover the component images themselves and the extraction of component layers images in the presence of reflections and transparency remains a problem. Therefore, what is needed is an optimal approach to recovering layer images and their associated motions from an arbitrary number of composite images. Also, there is a need for techniques that estimate the component layer images given known motion estimates.

SUMMARY OF THE INVENTION

To overcome the limitations in the prior art described above, and to overcome other limitations that will become apparent upon reading and understanding the present specification, the present invention is embodied in a system and method for extracting structure from multiple images of a scene by representing the scene as a group of image layers, including reflection and transparency layers.

In general, the present invention performs layer extraction from multiple images containing reflections and transparencies. The present invention includes an optimal approach for recovering layer images and their associated motions from an arbitrary number of composite images. The present invention includes image formation equations, the constrained least squares technique used to recover the component images, a novel method to estimate upper and lower bounds on the solution using min- and max-composites, and a motion refinement method.

Specifically, the present invention includes two different techniques for estimating the component layer images given known motion estimates. The first approach uses constrained least squares to optimally recover the layer images. The second approach iteratively refines lower and upper bounds on the layer images using two novel compositing operations, namely minimum and maximum composites of aligned images. These layer extraction techniques are combined with a dominant motion estimator and a subsequent motion refinement stage. This produces a completely automated system that recovers transparent images and motions from a collection of input images.

In one embodiment, the present invention involves first computing a primary motion estimate, second estimating a primary layer associated with the primary motion estimate, third computing a secondary motion estimate, fourth estimating a secondary layer associated with the secondary motion estimate and then iteratively refining lower and upper bounds on the primary and secondary layers to estimate the layers. In another embodiment motion estimates are improved by using motion re-estimation. Also, estimating the layers can be accomplished by using constrained least squares to optimally recover the layer images.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Operating Environment

Figure 1:
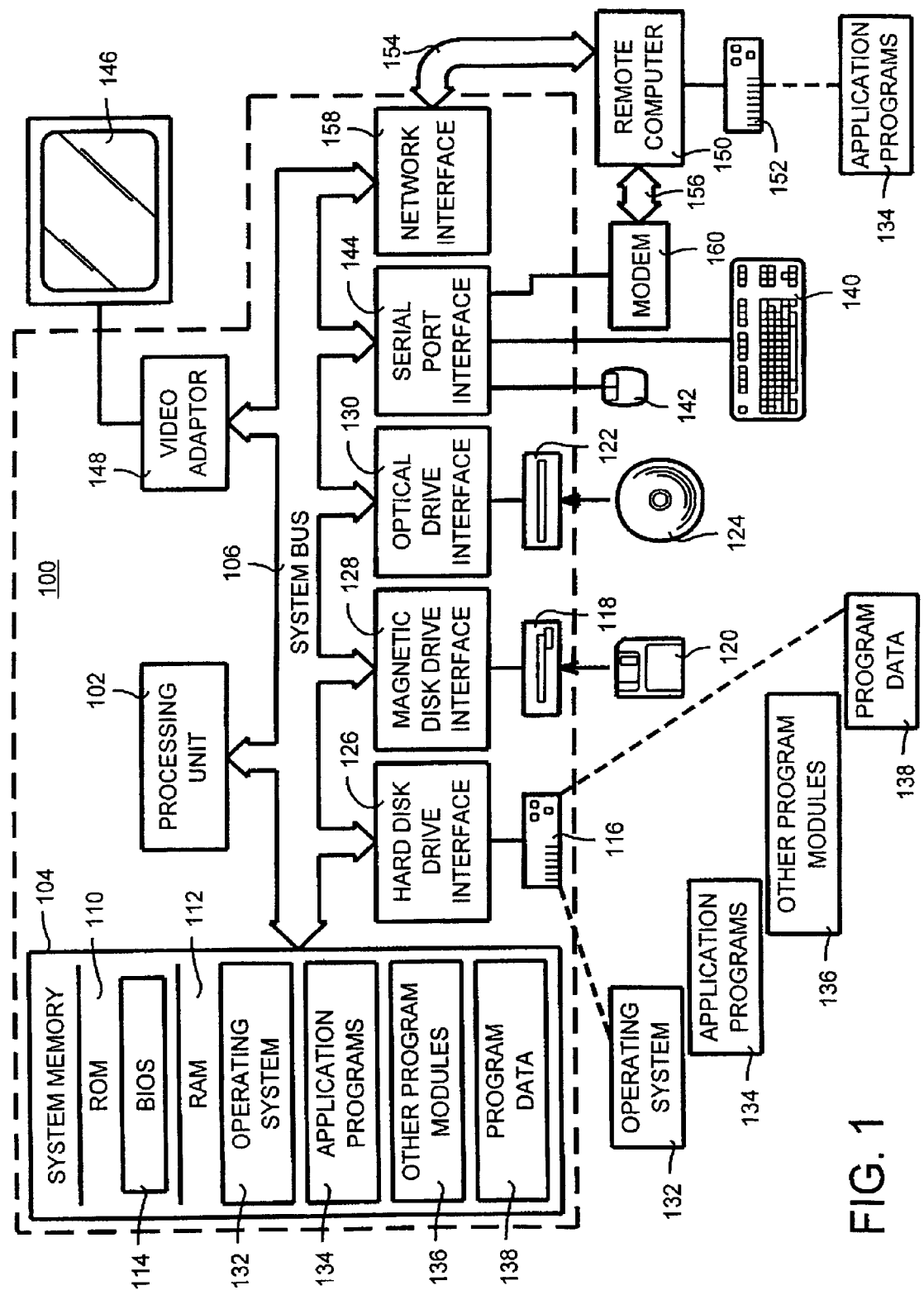
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

II. General Overview

Figure 2:
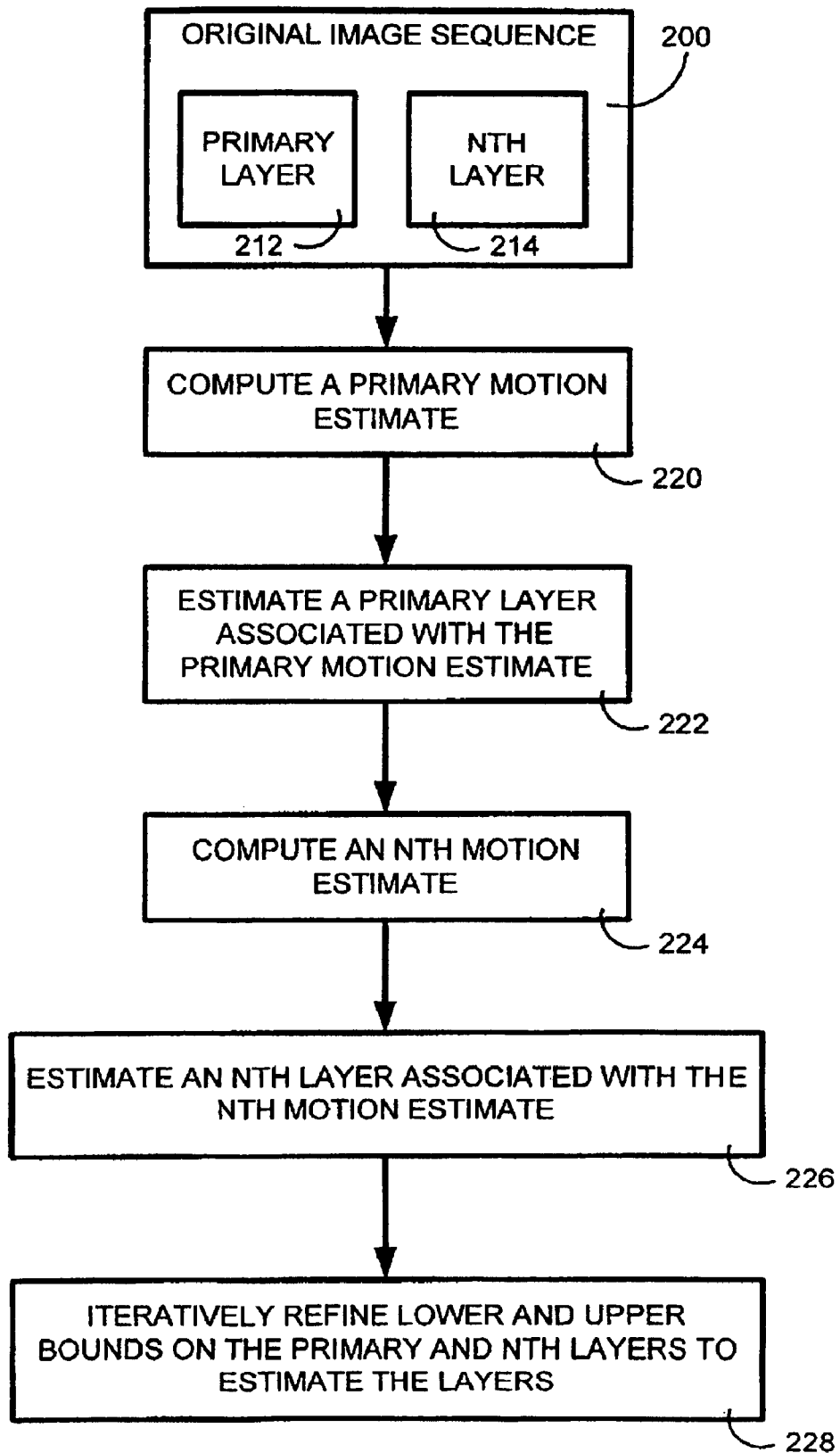
FIG. 2 is an overview block diagram of the present invention.

FIG. 2 is an overview block diagram of the present invention. The present invention is embodied in a system and method for extracting structure from multiple images of a scene by representing the scene as a group of image layers, such as reflection and transparency layers. A scene or an original image sequence 200 can contain mixtures of reflected (reflections) and transmitted light (transparencies) as component layers 212, 214 (a primary layer 212 and n layers 214), which can be super-imposed on one another. When viewed from a moving camera, these component layers 212, 214 can appear to move relative to each other to create multiple motions.

As such, it is desirable to extract the component layers 212, 214 in the presence of any reflections and transparencies and recover the multiple motions. The present invention accurately extracts the component image layers 212, 214 and then recovers their associated motions from an arbitrary number of composite images. Extracting structure from multiple images of the scene 200 by representing the scene as a group of image component layers 212, 214 is accomplished by the systems and methods described below.

In general, first, a primary motion estimate is computed (step 220) for the scene 200. Second, based on this primary motion estimate, a primary layer associated with the primary motion estimate is determined (step 222). Third, the scene 200 is analyzed and a secondary motion estimate is computed (step 224). Fourth, a secondary layer associated with the secondary motion estimate is estimated (step 226) based on the secondary motion estimate. Next, the primary and secondary layers are recovered by iteratively refining lower and upper bounds on the primary and secondary layers (step 228). Although the above description and the description that follows refer to primary and secondary layers (or dominant and non-dominant layers), it should be noted that more than two layers could be recovered by the present invention.

In addition, once the motion is known or for the case when the input composite images can be modeled as an additive mixture of the component layers (such a model applies when the light from one surface is reflected by another), a constrained least-square technique can be used to recover the layers from the known motions. It should be noted that this case applies to an arbitrary number of layers. Further, a complete technique that combines the layer extraction step together with an automatic multiple motion technique to recover the layers and their motions from the input images is preferably used.

In this case, for a complete solution, first, a dominant motion (for example, of the desired layer) for the sequence is computed using image alignment against a current min-composite. Second, a difference image calculation is computed between stabilized images and the min-composite. Third, non-dominant motion is computed by aligning the difference image calculation with a max-composite of the images. Fourth, initial layer estimates of the dominant and non-dominant motion estimates are used and the motion estimates are improved using motion re-estimation. Last, unconstrained least-squares are computed as an initial value and positivity constraints are used to solve a quadratic related to the layer extraction. The embodiments described above are provided as high level descriptions of the general operation of the present invention and will be discussed in detail below.

III. Details of the Components and Operation

A. Image Formation:

This section presents the general problem formulation, including the image formation equations. In "Ordinal characteristics of transparency", AAAI-90 *Work Qualitative Vision*, pp. 77-81, 1990, by E. H. Adelson and P. Anandan a recursive process was proposed as the generative model for obtaining a composite image from component layers. At each pixel, assuming a given spatial ordering of layers relative to the viewpoint, each layer partially attenuates the total amount of light coming from all the layers "behind it" and adds its own light to give an output signal. The final composite image is the result of applying this process to all layers in a back to front fashion. This process can be summarized in terms of the following modified form of the over operator used in image compositing, as described by J. F. Blinn. Jim Blinn's corner: in "Compositing, part 1: Theory", *IEEE Comp. Gr. and Appl.*, 14(5): 83-87, September 1994, $$F^\circ B = F + (1-\alpha_F)B, \tag{1}$$

where F and B denote the colors of the foreground and the background images. The standard definition of the over operator uses foreground colors that are premultiplied by the opacities of the foreground layer, hence, the R, G, and B values that must be $\leq \alpha$. In this case, this restriction is removed in areas of reflection, in order to handle additive composition.

For the purposes of the present invention, it is assumed that each component layer (indexed by l=0, ... L−1) is defined by a signal or 2D image $f_l(x)$, (where $f_l$ denotes layer l and x will is used to index both 1-D signals and 2-D images), which is warped to the current image (indexed by k) coordinate system via a warping operator $W_{kl}$, which resamples the pixels. Also, $W_{kl} \circ f_l$ denotes the warped image. Hence, the composite image (or the original image sequence) is given by the equation:

$$m_k = W_{k0} \circ f_0 \ldots W_{k(L-1)} \circ f_{L-1} \tag{2}$$

Next, it is assumed that $W_{kl}$ is an invertible global parametric motion (where $W_{kl}$ denotes the motion parameters of layer l and frame k), such as translation, rotation, affine, or perspective warp. Also, it is initially assumed that the $W_{kl}$ are known (it should be noted that this assumption is removed in Section III. D below).

Image formation and pure additive mixing of images can be expressed as:

$$m_k(x) = \sum_{l=0}^{L-1} W_{kl} \circ f_l(x). \tag{3}$$

An alternative way of writing the image formation equations is to look at the discrete image pixels written in (rasterized) vector form, $$m_k(x) = \sum_{l=0}^{L-1} W_{kl} f_l. \quad (4)$$

The above formula is equivalent to the first (continuous) formula if the images are sampled without aliasing (below their Nyquist frequency) and the warping does not unduly compress the layer images (thereby causing aliasing). The $W_{k1}$ matrices are very sparse, with only a few non-zero coefficients in each row (i.e., the interpolation coefficients for a given pixel sample). In addition to the image formation equations, it is known that the original layer images are non-negative, i.e., $f_l(x) \geqq 0$. As will be described below, this provides very important (and useful) constraints on the solution space.

For real images, there is a chance that the images may be saturated (i.e., $m_k(x)=255$ for 8-bit images) in some regions. An accurate model of the mixing process can be generated with a photo-metrically calibrated camera, i.e., cameras where the radiance to pixel-value transfer curve is known, as described by Paul E. Debevec and Jitendra Malik, in "Recovering high dynamic range radiance maps from photographs", *SIGGRAPH'97*, pp. 369-378, August 1997. For the description that follows, however, it is assumed that the mixing process is linear, but that the observed mixed signal values $m_k$ are clipped to 255. The extension to a truly calibrated camera is straightforward, but may require a level-dependent noise process to be added.

B. Recovering Component Images with Constrained Least Squares

This section presents the constrained least squares algorithm that is used to recover the component images and that was described generally above. Given a set of images $m_k$, the layer images $f_l$ can be recovered. Since the image formation equations are linear, constrained least squares, $$\min \sum_k \left\| \sum_{l=0}^{L-1} W_{kl} f_l - m_k \right\|^2 \text{ s.t. } f_l \geq 0, \quad (5)$$

can be used. Such a least squares estimator is statistically optimal if the measured input images are corrupted by uniform independent (white) Gaussian noise. The least squares problem is constrained, since it is required that all of the elements in the $f_l$ images be non-negative. Also, for any pixel in $m_k$ that is saturated (255), only the mismatch between $m_k$ and the mixed layers is penalized if the predicted value is below 255.

This least squares problem is very large (one term or linear equation per measured input pixel), and very sparse (only a few non-zero coefficients per equation). Iterative techniques, such as variants of gradient descent or conjugate gradient, should be used. For instance, for a 1-D signal, it should be usually possible to form a narrow-banded problem by interleaving the layer pixel. These 1D examples will be discussed below for illustrative purposes.

For the current implementation of the present invention, a two stage approach is preferably used for solving the constrained least-squares problem and is discussed with the entire system with reference to FIGS. 5-8 below. Generally, first, the problem is solved without constraints using a Preconditioned Conjugate Gradient (PCG) method. Any standard mathematical technical computing environment for combining, for example, numeric computation, advanced graphics and visualization, and a high-level programming language can be used. The mathematical computing environment can have functions for the PCG for data analysis and visualization, numeric and symbolic computation, engineering and scientific graphics, modeling, simulation, and prototyping, programming, application development, and GUI design. Using the PCG method as an initial estimate, a Quadratic Programming (QP) technique can be used with the positivity constraints enabled (again using a standard function in the mathematical technical computing environment) to obtain the constrained optimal solution.

The constrained least-square problem posed in Equation 5 has a unique solution unless the set of relative motions between the component layers in the input composites is degenerate (or poorly conditioned) in some fashion. Under the general (non-degenerate) condition, given known motion, the component layers from the input composites can be recovered. In practice, although it is usually not assumed that the motions are known, indeed the estimation of the motion is an important part of the overall technique. This will be discussed further in sections III. D.

Namely, the positivity constraints on the component signals (images) restrict the solution to be in a convex subspace. Therefore, the quadratic programming program posed in Equation 5 does not suffer from multiple local minima. Without the constraints, the solution is not unique. This can be seen even without analyzing the particular structure of the $W_{k1}$ matrices, based on the following reasoning. If $\{\tilde{f}\}$ is a set of component layer signals (images) that minimizes the least-squares error defined in Equation 5, since each input image is simply a sum of warped and resampled versions of these components, a constant image can be subtracted to one of the layers. This amount can be distributed (added) among the other layers without changing the sum. The new set of layer thus obtained is also a valid solution to the unconstrained minimization problem posed in Equation 5. This implies that the system of equations is degenerate.

Figure 3B:
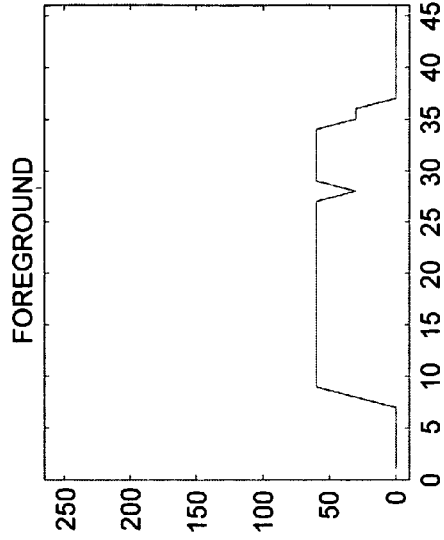
FIGS. 3A-3E show a constrained least square illustration using a one-dimensional example.
Figure 3D:
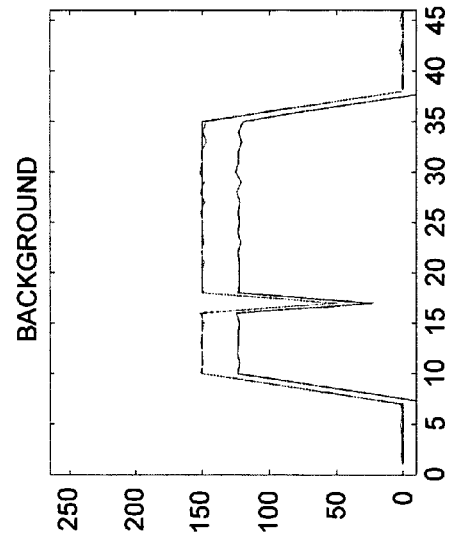
Figure 3A:
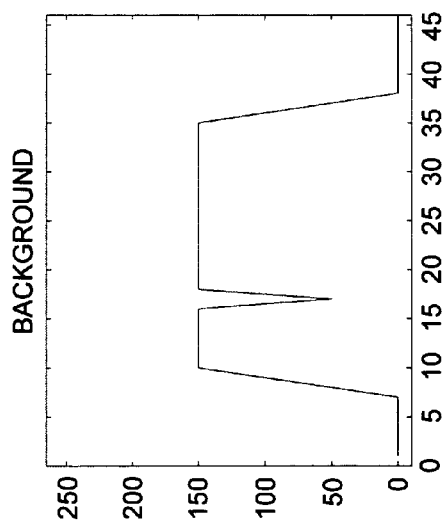
Figure 3C:
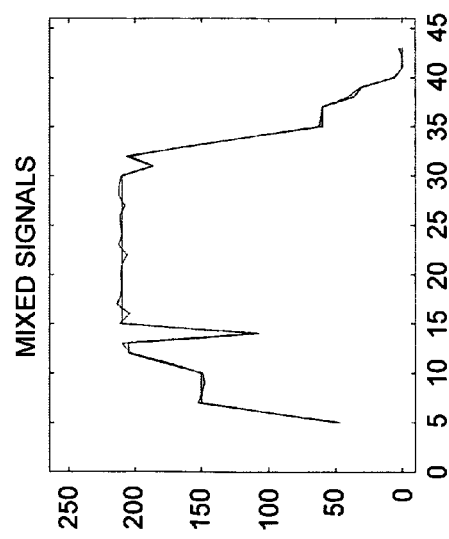
Figure 3E:
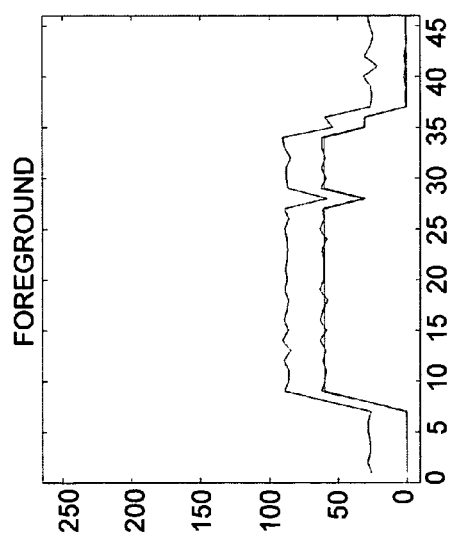

FIGS. 3A-E illustrate this degeneracy, using a one-dimensional example. FIGS. 3A and 3B show the plots of the two input component layers. Five mixed signals were created by shifting these two relative to each other by different (known) amounts and adding random Gaussian noise. As an example, one of these five mixed signals is shown in FIG. 3C. The solid curves in FIGS. 3D and 3E show the recovered component layers signals obtained by solving the unconstrained least-squares problem, using a "pseudo-inverse" (minimum norm) technique. Note that the recovered signal (solid line) is offset from the true signal (similar results are obtained in the noise-free case as well). For the two layer case, the amount of this offset is equal to half the difference between the mean foreground and background layers values.

In practice, this degeneracy is not too critical, since it leads to simply a DC offset of the signals. Moreover, if each layer has at least one pixel that is black (i.e., signal value of zero), this degeneracy can be removed using the positivity constraint. This is because subtracting an offset from any of the layers will lead to at least one negative valued pixel, which violates the positivity constraint. The result of solving the constrained least-square problem is shown as the upper curve in FIG. 3D and the lower curve in FIG. 3E. As shown, these reconstructed signals differ from the input signals only by small random noise. In other words, solving the optimization problem with constraints appears to fix the degeneracy in the system. It should be noted, however, if there is some layer that has no black pixel (i.e., $f_1 \geq c$, where c>0), the solution can only be determined up to an offset of c.

In practice, in 2D images, there may also be additional source of degeneracy or poor conditioning due to the structure of the warping matrix $W_{k1}$. In the case when the relative motion between the component layers consists of shifts purely in the horizontal (or vertical) direction. In this case, the overall problem decouples into a set of independent problems corresponding to each row (or column). Each row will be determined only up to an arbitrary but different DC offset. To impose the positivity constraint and obtain a unique solution, each row in each layer must have a black pixel, which may be unrealistic. Hence, even the use of the positivity constraints may not guarantee the correct recovery of component layers. In summary, the constrained least-square problem posed in Equation 5 has a unique solution unless the set of relative motions between the component layers in the input composites is degenerate (or poorly conditioned) in some fashion, as discussed above.

C. Estimating Upper and Lower Bounds with Min/Max Alternation

This section illustrates estimating upper and lower bounds on the solution using min- and max-composites. In order to run the constrained least-squares algorithm, the motions for all of the layers must be known. Unfortunately, in many image sequences, only the dominant motion can be reliably estimated at first. Thus, estimating the non-dominant motion(s) is important to the overall problem. In this section, a novel algorithm is proposed that iteratively re-estimates upper and lower bounds on two component layers. This estimation can be interleaved with layer motion estimation.

The present technique is based on the following observation. Once the dominant motion has been estimated, an estimate for the layer corresponding to this motion can be obtained by forming a mosaic from the stabilized image sequence. However, unlike conventional mosaics, where either an average or median is used to form the estimate (sometimes with appropriate feathering near the edges), the present invention computes the minimum pixel value across all images in the stabilized sequence.

The min-composite estimate is computed because the contributions from other layers can only add to the intensity at a given pixel. Therefore, the min across all mixed images gives an upper bound on the possible value for the dominant layer. More formally, let $$s_k = W_{k0}^{-1} m_k = f_0 + \sum_{l=1}^{L-1} W_{k0}^{-1} W_{kl} f_l \qquad (6)$$

be the set of images stabilized with respect to layer 0. Then, $$f_0^{max} \min_k s_k = f_0 + \sum_{l=1}^{L-1} \min_k W_{k0}^{-1} W_{kl} f_l \qquad (7)$$

is an upper bound on $f_0$.

Once an estimate for layer 0 is found, the difference images can be computed $$d_k = s_k - f_0^{max}. \qquad (8)$$

These difference images give the luminance that is accounted for by the other layers (where $s_k$ denotes the stabilized image sequence with respect to layer 0, $f_0^{max}$ denotes the MIN composite and $d_k$ denotes the difference sequence).

Now, distributing this residual error among the remaining layers is important. For this reason, the two layer (foreground/background) case is described. This is not a big limitation in practice, since multiple reflections/transmissions are relatively rare.

In the two layer case, the difference images $d_k$ are a partial estimate (lower bound) on the amount of light in layer 1. These images can be stabilized using a parametric motion estimator (assuming that the motion is not known a priori), and thereby compute $W_{k1}$. Let $$t_k = W_{k1}^{-1} W_{k0} d_k = f_1 + W_{k1}^{-1} W_{k0} (f_0 - f_0^{max}) \qquad (9)$$

be the set stabilized of difference images. A max-composite can then be computed of the stabilized differences, $$f_1^{min} = \max_k t_k = f_1 + \max_k W_{ki}^{-1} W_{k0} (f_0 - f_0^{max}). \qquad (10)$$

Since $f_0 - f_0^{max} \leq 0$, each $t_k$ is an underestimate of $f_1$, and $f_1^{min}$ is the tightest lower bound on $f_1$ it can be computed (where $t_k$ denotes the stabilized difference sequence, and $f_1^{min}$ denotes the MAX composite).

With the improved lower bound estimate for $f_1$ (it should be noted that $f_1 \geq 0$ was an initial value), a better estimate (tighter upper bound) for $f_0$ can be recomputed. Instead of stabilizing the original input images $m_k$, the corrected images can be stabilized $$c_k = m_k - W_{k1} f_1^{min} \qquad (11)$$

to obtain $$s_k = W_{k0}^{-1} c_k = f_0 + W_{k0}^{-1} W_{k1} (f_1 - f_1^{min}) \qquad (12)$$

The amount of overestimate in each stabilized image $s_k$ is now proportional to the difference between the lower bound on $f_1$ and its true value.

Thus, an improved estimate for $f_0^{max}$ can be obtained, and this can be used to obtain an improved estimate for $f_0^{min}$. This iteration eventually leads to the correct solution. Under ideal conditions (to be defined below), the min/max alternation algorithm described above will compute the correct estimates for $f_0$ and $f_1$. The time required to do so depends on the diameter of the largest non-zero region in the foreground layer ($f_1$) divided by the diameter of the shifting operation seen in all input images (to be defined below).

For the above, it is assumed that at least one pixel in the foreground layer is zero. If not, then min/max alternation will compute the best lower bound on $f_1$ it can (which will contain at least one zero value) and stop. Also, it is assumed that there is only one isolated region (otherwise, the above applies to each region independently). The ideal conditions mentioned above come in two parts. First, the entries in the $W_{k1}$ and $W_{k1}^{-1}$ matrices are non-negative and second, there is no imaging noise. The first condition is, in general, only attainable if the layers are shifted by integral amounts. The second condition is, of course, not attainable in practice. But these ideal conditions can be compensated for, as will be discussed below.

For the improved estimate, as described above, x is set to be the coordinate of some pixel where $f_1(x)=0$. Let $x' \in N(x)$ be the shift-induced neighborhood of x, i.e., the set of pixels in the $m_k$ images that are formed using $f_1(x)$. Then, since $\min_k W_{k1} f_1(x) = 0$ for any pixel in $N(x)$, $f_0^{max}(x') = f_0(x')$, i.e., the upper bound is exact at these pixels. Further, the difference signals at these pixels is exact (the lower bound matches the true value of the shifted $f_1$ signal). Therefore, the pixels in $f_1$ where $x'' \in N'(x')$, i.e., the pixels being re-estimated using at least one correct element in $f_0$, will have the correct estimated value, $f_1^{min}(x'')=f_1(x'')$.

This process will grow regions of correct estimates out from pixels in the foreground that are black. These regions can grow quickly and can eventually cover the entire image. For example, $x' \in N(x)$ can be analogized as a morphological dilation operator that spreads good pixels (initially, the black ones) in $f_1$ into good estimates of $f_0$. Similarly, $x'' \in N'(x')$ is the morphological dilation operator that spreads good pixels in $f_0$ into good pixels in $f_1$. Each dilation operation eats away at the borders of the regions that have potentially erroneous estimates of $f_0$ and $f_1$. The number of operations required is the (outside) diameter of the largest such region divided by the (inside) diameter of the dilation operator.

Figure 4A:
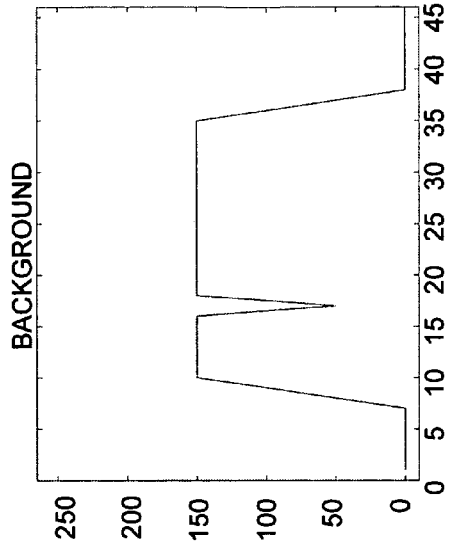
FIGS. 4A-4H show a min/max alternation illustration using a one-dimensional example.
Figure 4C:
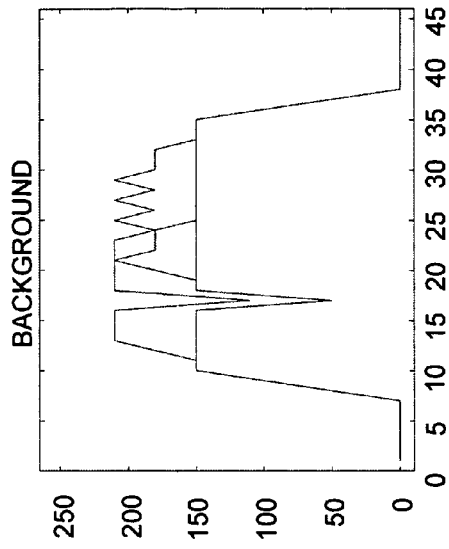
Figure 4B:
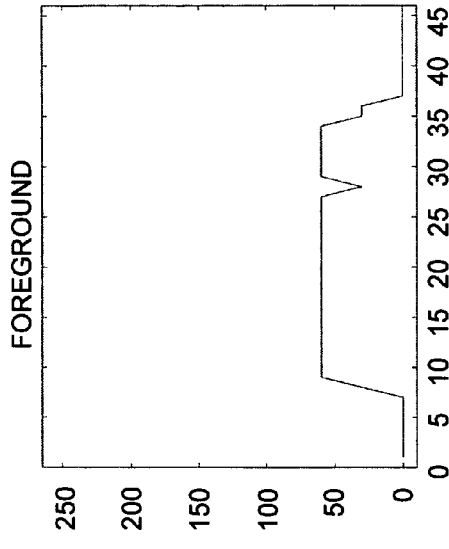
Figure 4D:
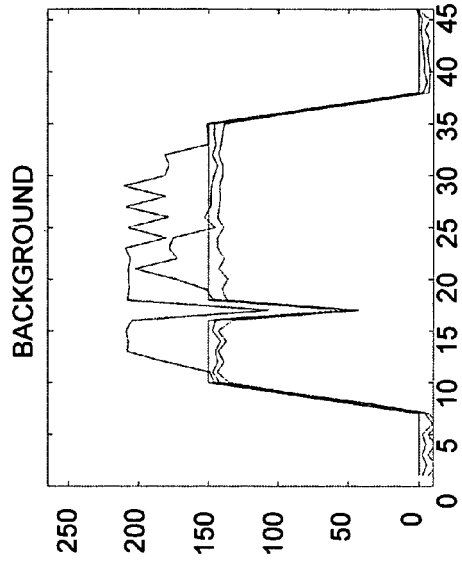

FIGS. 4C and 4D show the results of running our min/max technique on a simple 1-D signal with ±1 shifts in x. The solid curve shows the background (and foreground) signals after 1 iteration, the dashed after 2 iterations, and the phantom curve is after 3 iterations. Note that convergence has already been achieved after 3 iterations. Also, it should be noted that the technique described above is for computing upper bounds for one layer, and lower bounds for another. The process could also be run the other way around (once motion estimates are known for both layers) to simultaneously compute upper and lower bounds.

1. Noise and Resampling

Figure 4E:
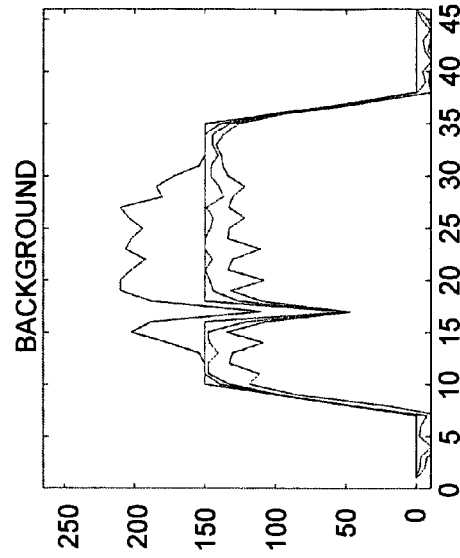
Figure 4F:
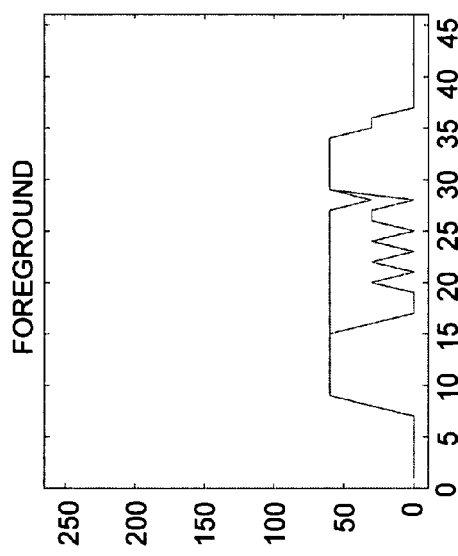

The min-max technique is powerful in that it guarantees global convergence. However, the ideal conditions mentioned above should be satisfied. When noise is present, the upper and lower bounds computed by min/max may become erroneous at each iteration, leading to a divergence away from the correct solution. This behavior can be seen in FIGS. 4E and 4F.

Similarly, the subpixel interpolation involved in the resampling process can also lead to a bad solution. There are two potential problems when resampling the images. The first is that some entries in the $W_{k1}$ and $W_{k1}^{-1}$ matrices may be negative (for a positive interpolants $W_{k1}$ such as bilinear or B-splines, the inverse warp will have negative sidelobes). In these cases, the upper/lower bound estimates $f_0^{max}$ and/or $f_1^{min}$ computed in Equations 7 and 10 may be invalid (too tight). These errors propagate from iteration to iteration, and can eventually come up with global solutions that are invalid (that may not satisfy the constraints).

The second potential problem is that an approximation to $W_{k1}^{-1}$ is being used. This happens quite often, for example when bi-linear or bi-cubic filtering is used in conjunction with a hardware or software perspective warping algorithm (in both directions). If in this case, while the entries in $W_{k1}$ and $W_{k1}^{*}$ (the approximate inverse) may be non-negative, Equation 7 is no longer valid. Instead, the equation should read $$f_0^{max} = W_{k0}^* W_{k0} f_0 + \sum_{l=1}^{L-1} \min_k W_{k0}^* W_{ki} f_l. \qquad (13)$$

Figure 4G:
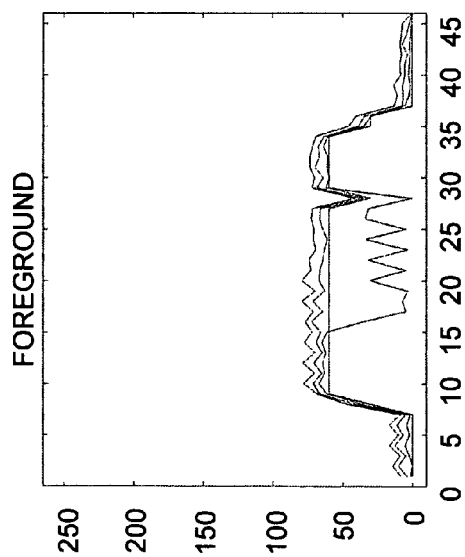
Figure 4H:
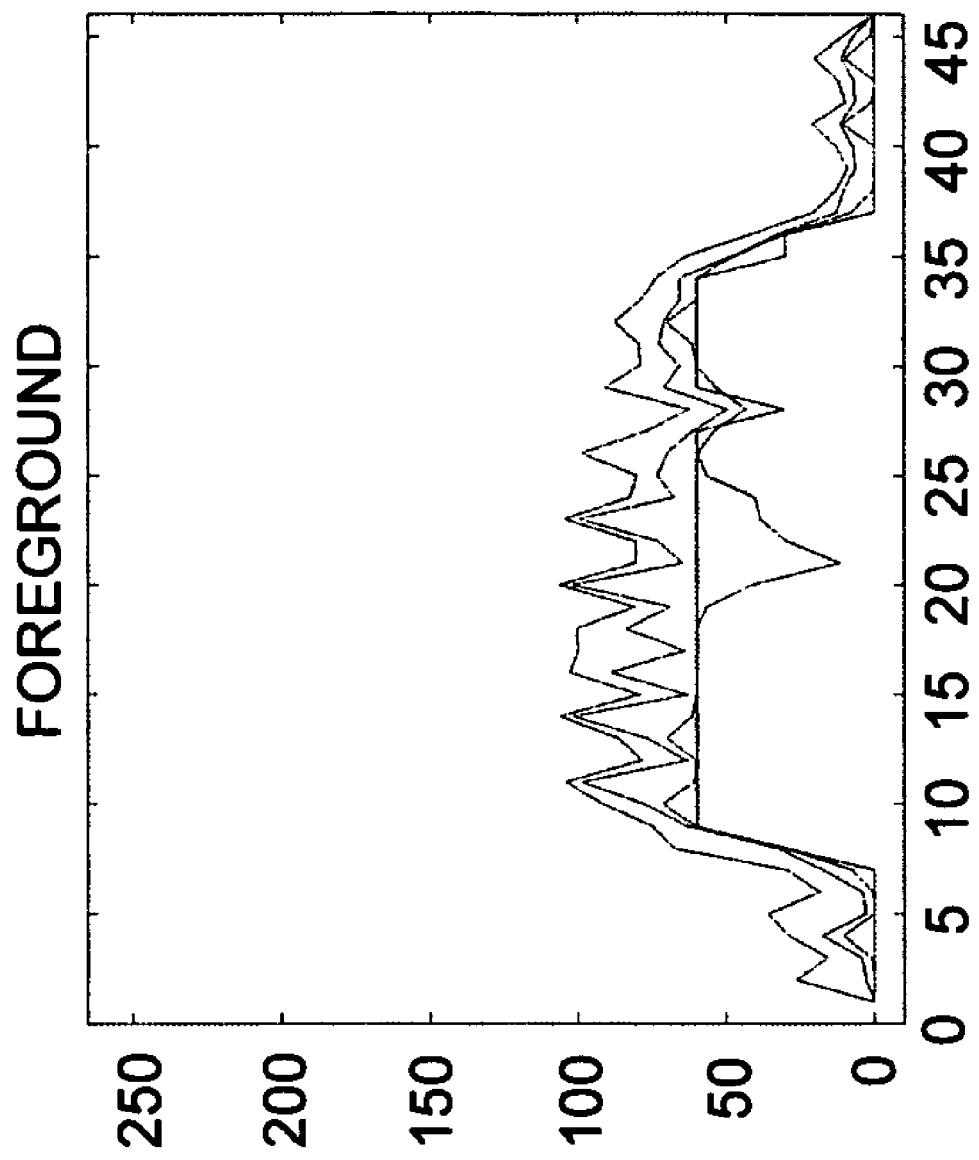

There is no longer any guarantee that the first term is not less than $f_0$. In practice, it is observed that the algorithm starts to diverge rather quickly (FIGS. 4G and 4H).

D. Motion Refinement: Re-estimating the Layer Motions

This section presents the motion refinement technique of the present invention, as described in general above. Once layer estimates are found (starting with one iteration of the min/max algorithm to compute the initial dominant and non-dominant motions, and optionally followed by an initial solution of the constrained least squares), the motion estimates can be refined.

The refinement technique of the present invention is similar to parametric motion estimations. Namely, expanding equation 5 using a Taylor series in the motion parameters $P_{k1}$, the following is obtained $$\sum_k \sum_x \left[ \sum_{l=0}^{L-1} f_l(x_{ki}(x; p_{ki})) - m_k(x) \right]^2 \approx$$
$$\sum_k \sum_x \left[ \lambda_k(x) + \sum_{l=0}^{L-1} \nabla f_l(x_{ki}(x; p_{ki})) \frac{\partial x_{ki}}{\partial p_{ki}} \nabla p_{ki} \right]^2$$

The errors $\lambda_k(x)$ are then computed (difference between predicted and observed signals). The gradients $\nabla f_1$ are computed for each layer separately, and used to compute that layer's motion.

E. Complete Solution for Estimating the Component Layer Images and Their Associated Motions.

Based on the above, a complete solution can be formulated that estimates the component layer images and their associated motions, in accordance with the present invention. The complete solution can be summarized as follows with reference to FIGS. 5-8:

1. Compute a dominant motion for the sequence using image alignment against the current min-composite $f_0^{max}$.
2. Compute the difference images $d_k$ between the stabilized images and the min-composite $f_0^{max}$.
3. Compute the non-dominant motion by aligning the difference images $d_k$ with a max-composite of these images.
4. Using the initial layer guesses, improve the motion estimates using the motion re-estimation algorithm.
5. Compute the unconstrained least-squares solution.
6. Using this result as the initial value, solve the quadratic-programming problem with the positivity constraints.
7. Optionally alternate the least-squares optimization of layer values with motion re-estimation.

Figure 5:
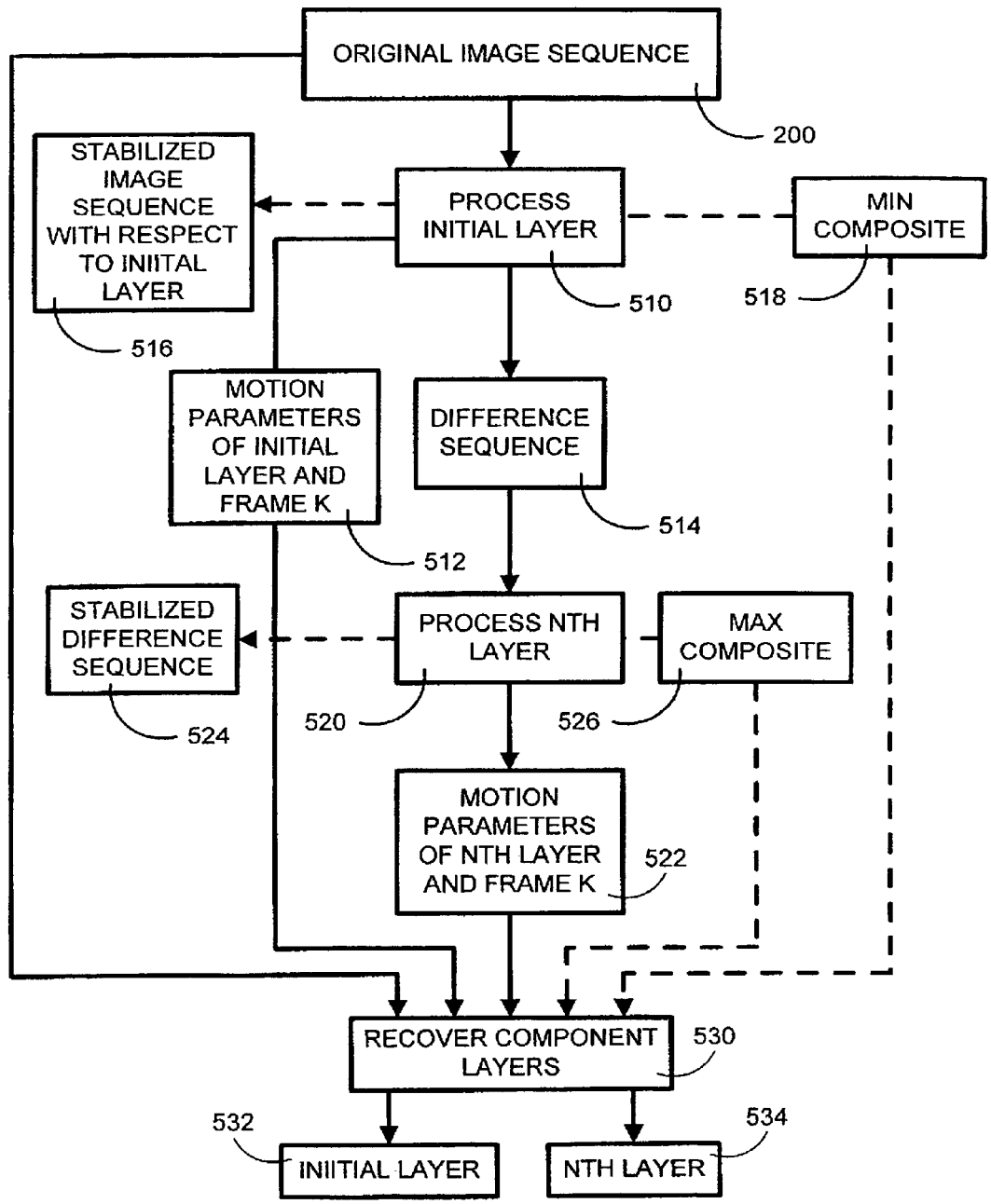
FIG. 5 shows the operational and functional details of the present invention.

FIG. 5 shows the operational and functional details of the present invention. For the case when the input composite images can be modeled as an additive mixture of the component layers (such a model applies when the light from one surface is reflected by another), a constrained least-square technique can be used to recover the layers from known motions. Further, a complete technique that combines the layer extraction step together with an automatic multiple motion technique to recover the layers and their motions from the input images is preferably used.

Figure 6:
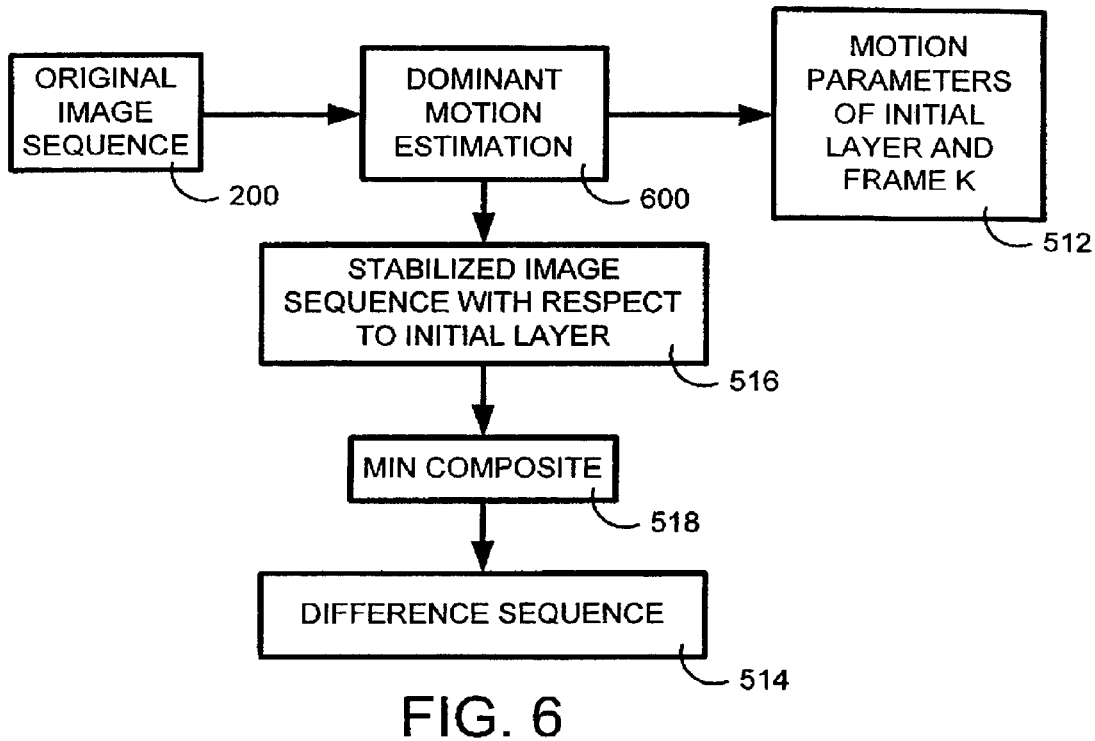
FIG. 6 shows additional details for processing the first layer of FIG. 3 of the present invention.
Figure 7:
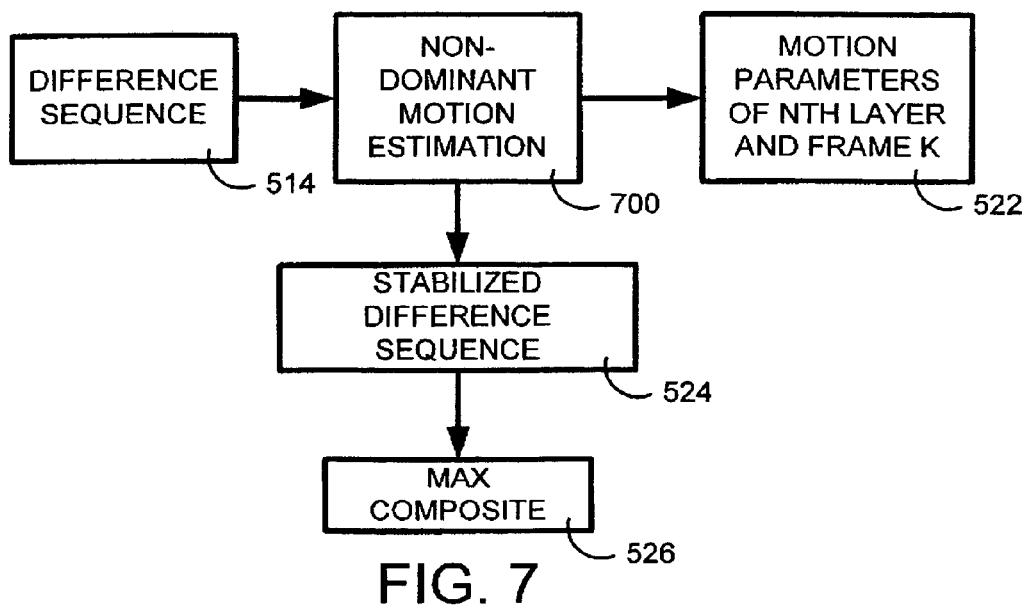
FIG. 7 shows additional details for processing the second layer of FIG. 3 of the present invention.
Figure 8:
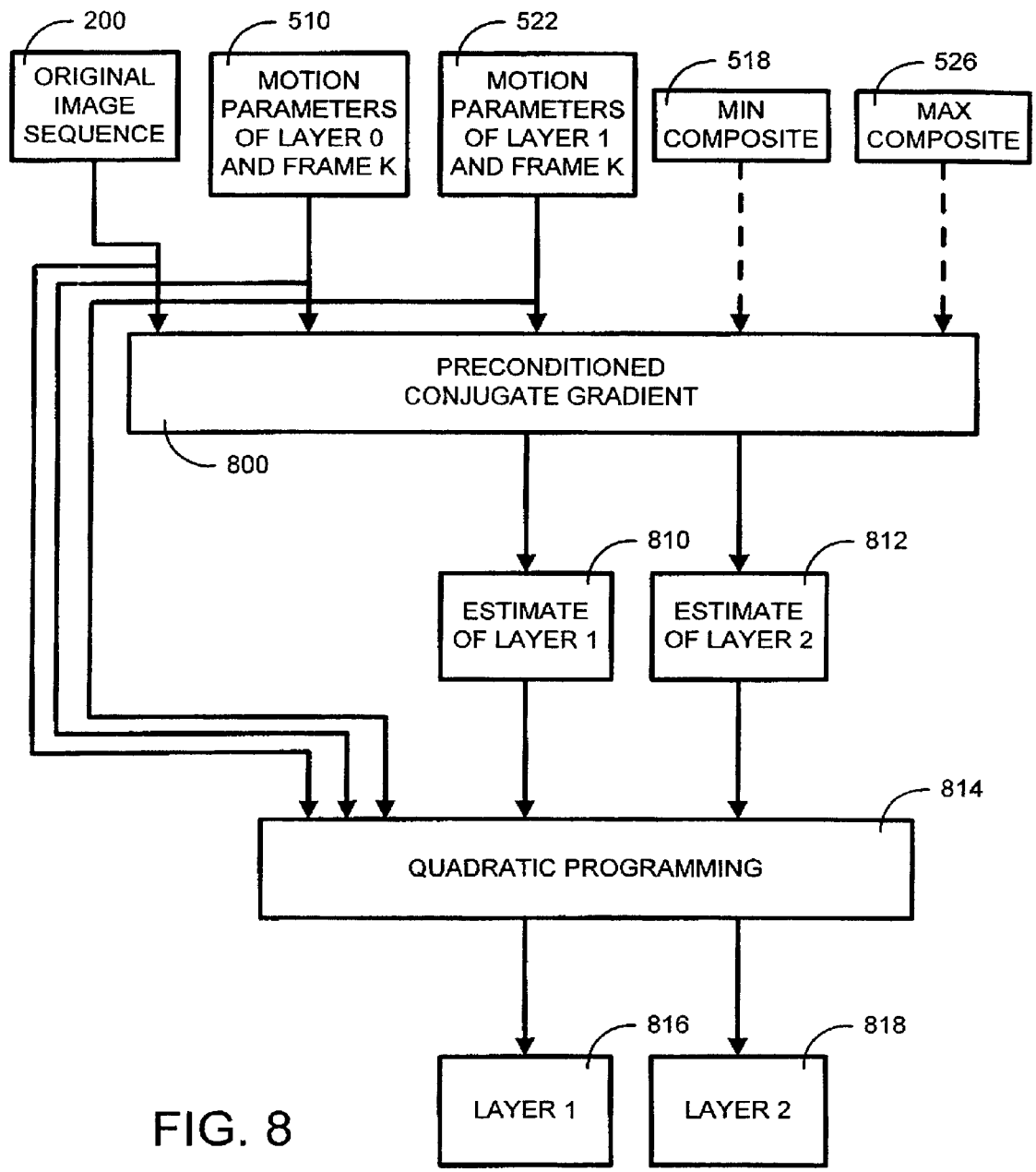
FIG. 8 shows additional details for recovering component images of FIG. 3 of the present invention.

In general, referring to FIG. 5, along with FIG. 6, first, an initial layer 510 of the original image sequence 200 of FIG. 2 is processed. From this processing, motion parameters 512 of the initial layer 510 are produced along with a difference sequence 514. Preferably, the initial layer 510 is the desired layer that contains the dominant motion 600 of the image sequence 200. Also, a stabilized image sequence 516, with respect to the initial layer, along with a min composite 518 can be optionally produced. The min composite 518 can serve as an initial guess for the constrained least square calculation of FIG. 7. The dominant motion estimation 600 for the sequence can be computed using image alignment against the current min-composite 518. The difference image calculation is computed between the stabilized images and the min-composite 518.

Next, the difference sequence 514 is used to process a secondary layer 520 of the original image sequence 200 of FIG. 2. Referring to FIG. 4 along with FIG. 7, with respect to the secondary layer 520, motion parameters 522 of the secondary layer are produced. The secondary layer contains the non-dominant motion 700 of the image sequence 200. Also, a stabilized image sequence 524 along with a max composite 526 can optionally be produced. The max composite 526 can serve as an initial guess for the constrained least square calculation of FIG. 8. The non-dominant motion 700 can be computed by aligning the difference image calculation with the max-composite 526 of the images. Initial layer estimates of the dominant and non-dominant motion estimates 600, 700 are then used to improve the motion estimates using motion re-estimation.

A constrained least squares technique 530 can be then used to recover the component layers 532, 534. Referring to FIG. 4 along with FIG. 8, namely, the constrained least squares technique 530 can receive as input the original image sequence 200, the motion parameters of the initial and secondary layers 510, 520 and the min and max composites 518, 526. The constrained least-square calculation 530 solves for the layers by first performing a preconditioned conjugate gradient (PCG) 800 and then it enforces a positivity constraint by using a quadratic programming module 814. In other words, the preconditioned conjugate gradient 800 with unconstrained least-squares can be computed for producing initial value estimates 810, 812 and the positivity constraints can be used to solve a quadratic with the quadratic programming module 814 that is related to the layer extraction to extract the initial and secondary layers 816, 818. Alternatively, instead of running PCG, the MIN/MAX composites can be used as initial guess to the quadratic programming. Finally, the entire process can be repeated for a couple of times to refine the result.

IV. Conclusion

In summary, the present invention extracts a set of component layers from a collection of composite images. While the problem of recovering the multiple motions from such sequences has been extensively studied (at least when the motions are parametric), the problem of extracting the layer images in the presence of reflections and transparency has not been adequately treated until now.

The present invention is embodied in a system and method for recovering the layer images and their motions from the input sequence. For the case when the input composite images can be modeled as an additive mixture of the component layers (such a model applies when the light from one surface is reflected by another), a constrained least-square technique can be used to recover the layers from known motions. Further, a complete technique that combines the layer extraction step together with an automatic multiple motion technique to recover the layers and their motions from the input images has been described.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for estimating upper and lower bounds of a sequence of images for extraction of the images, comprising:
    using a computer processor for:
    aligning the images of the sequence against a current minimum composite of the images of the sequence, wherein the minimum composite comprises the minimum pixel value across the images of the sequence and gives an upper bound of an image layer;
    computing a difference image calculation between each of the aligned images and the minimum composite; and
    aligning the difference images with a maximum composite of the images, wherein the maximum composite comprises the maximum pixel value across the images of the sequence, in order to estimate a lower bound of an image layer; and
    using the upper and lower bounds to extract a layer of the sequence of images.

2. The method of claim 1, further comprising continually performing the method a predefined amount to iteratively refine lower and upper bound parameters of the images.

3. The method of claim 1, computing unconstrained least-squares as an initial value and using positivity constraints to solve a quadratic related to the extracted images.

4. A computer-readable medium having computer-executable instructions for performing the method recited in claim 1.

* * * * *